(12) United States Patent
Patil et al.

(10) Patent No.: US 10,374,970 B2
(45) Date of Patent: Aug. 6, 2019

(54) DEPLOYING A CLOUD SERVICE WITH CAPACITY RESERVATION FOLLOWED BY ACTIVATION

(71) Applicant: Microsoft Technology Licensing, LLC, Redmond, WA (US)

(72) Inventors: Prajakta Patil, Redmond, WA (US); Sushant Pramod Rewaskar, Redmond, WA (US); Ajay Mani, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 242 days.

(21) Appl. No.: 15/421,797

(22) Filed: Feb. 1, 2017

(65) Prior Publication Data

US 2018/0219794 A1 Aug. 2, 2018

(51) Int. Cl.
*H04L 12/911* (2013.01)
*G06F 9/50* (2006.01)

(52) U.S. Cl.
CPC .......... *H04L 47/746* (2013.01); *G06F 9/5072* (2013.01); *H04L 47/745* (2013.01); *H04L 47/783* (2013.01); *G06F 2209/503* (2013.01); *G06F 2209/5014* (2013.01)

(58) Field of Classification Search
CPC ....... G06F 2209/5014; G06F 2209/503; G06F 9/5072; H04L 47/745; H04L 47/746; H04L 47/783
See application file for complete search history.

(56) References Cited

U.S. PATENT DOCUMENTS 7,707,573 B1 * 4/2010 Marmaros ................ G06F 8/61
709/224
7,890,629 B2 * 2/2011 Jackson .................. G06F 9/468
709/225

(Continued)

FOREIGN PATENT DOCUMENTS

EP 2037634 A1 3/2009

OTHER PUBLICATIONS

"International Search Report and Written Opinion Issued in PCT Application No. PCT/US18/015117", dated May 7, 2018, 19 Pages.

(Continued)

*Primary Examiner* — Mohamed A. Wasel
(74) *Attorney, Agent, or Firm* — Ray Quinney & Nebeker P.C; James Bullough (57) ABSTRACT

A system receives a request for a plurality of resources of a cloud computing system to deploy a service. The system selects a portion of the resources and determines whether the selected portion is at least partially available in one or more clusters in parallel. If available, the system reserves the available resources for a predetermined period of time. If unavailable in one of the clusters, the system releases the reserved resources after the predetermined period of time. While or after determining the availability, the system locates at least a portion of the remainder of the resources in the one or more clusters. The system allocates the reserved resources on one of the clusters and the located remainder of the resources to deploy the service and instantiates the service on the one of the clusters using the allocated resources.

17 Claims, 4 Drawing Sheets

(56) References Cited

U.S. PATENT DOCUMENTS

| | | | |
|---|---|---|---|
| 7,917,385 B2* | 3/2011 | Fehnel | G06Q 10/0631 |
| | | | 705/7.31 |
| 8,321,871 B1* | 11/2012 | Jackson | G06F 9/5027 |
| | | | 718/104 |
| 8,578,381 B2 | 11/2013 | Podila | |
| 9,059,944 B2 | 6/2015 | Damola et al. | |
| 9,264,376 B2 | 2/2016 | Madduri et al. | |
| 9,363,198 B2 | 6/2016 | Ferris | |
| 9,497,136 B1 | 11/2016 | Ramarao et al. | |
| 9,959,140 B2* | 5/2018 | Jackson | G06F 9/50 |
| 2003/0154112 A1* | 8/2003 | Neiman | G06F 9/5044 |
| | | | 705/5 |
| 2007/0127527 A1 | 6/2007 | Dan et al. | |
| 2007/0266388 A1 | 11/2007 | Jackson | |
| 2008/0270674 A1 | 10/2008 | Ginzton | |
| 2012/0131594 A1* | 5/2012 | Morgan | G06F 9/5072 |
| | | | 718/105 |
| 2013/0111027 A1 | 5/2013 | Milojicic et al. | |
| 2014/0068056 A1 | 3/2014 | Simitsis et al. | |
| 2014/0237550 A1 | 8/2014 | Anderson et al. | |
| 2015/0006733 A1* | 1/2015 | Khan | H04L 47/70 |
| | | | 709/226 |
| 2015/0220364 A1* | 8/2015 | Jackson | G06F 9/505 |
| | | | 718/104 |
| 2016/0217403 A1 | 7/2016 | Gupte et al. | |
| 2017/0034070 A1* | 2/2017 | Kollur | H04L 47/70 |

OTHER PUBLICATIONS

Rao, et al., "Active Resource Allocation Management in Virtual Cloud Instances", In International Journal of Electrical Electronics & Computer Science Engineering, Oct. 2014, pp. 9-12.

Foster, et al., "A Distributed Resource Management Architecture that Supports Advance Reservations and Co-Allocation", In Seventh International Workshop on Quality of Service, May 31, 1999, pp. 1-16.

Sotomayor, et al., "Capacity Leasing in Cloud Systems using the OpenNebula Engine", In Proceedings of Workshop on Cloud Computing and its Applications, Oct. 2008, 5 pages.

Saraswathi, et al., "Dynamic Resource Allocation Scheme in Cloud Computing", In Procedia Computer Science, vol. 47, 2015, pp. 30-36.

* cited by examiner

DEPLOYING A CLOUD SERVICE WITH CAPACITY RESERVATION FOLLOWED BY ACTIVATION

FIELD

The present disclosure relates generally to cloud computing systems and more particularly to deploying a cloud service with capacity reservation followed by activation.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A cloud-based service of a customer is typically deployed in a cloud computing environment using the following workflow. First, a tenant model is generated based on user inputs provided by the customer. Subsequently, based on the tenant model, cloud resources such as computing, networking, and storage resources are located in the cloud computing environment and are committed/allocated to the service according to the customer's requests. Thereafter, the service is activated (i.e., started or executed) using the allocated resources.

In this process, if the service deployment fails due to unavailability of one of the resources, all other committed resources have to be rolled back (unallocated and released). Thereafter, the whole deployment process has to be reinitiated to reattempt all resource allocations in the intended sequence. This adversely affects deployment performance and customer experience.

SUMMARY

A system for deploying a service in a cloud computing system comprises a processor and machine readable instructions stored on a tangible machine readable medium. When executed by the processor, the machine readable instructions configure the processor to receive a request for resources to deploy the service on the cloud computing system, the resources including computing resources and remainder of the resources including networking and storage resources. The machine readable instructions configure the processor to determine whether a portion of the computing resources is at least partially available in one or more clusters of nodes in the cloud computing system, the determination being made in parallel. The machine readable instructions configure the processor to reserve for a predetermined period of time, when the portion of the computing resources is at least partially available in one or more clusters, the at least partially available portion of resources in the one or more clusters to deploy the service on the cloud computing system. The machine readable instructions configure the processor to release within or after the predetermined period of time, when the portion of the computing resources is at least partially unavailable in one of the clusters, the reserved resources in the one or more clusters. The machine readable instructions configure the processor to locate at least a portion of the remainder of the resources in the cloud computing system while determining whether the portion of the computing resources is at least partially available in the one or more clusters. When the portion of the computing resources is at least partially available in the one or more clusters, the machine readable instructions configure the processor to allocate the reserved resources on one of the clusters and the located portion of the remainder of the resources to deploy the service on the cloud computing system and instantiate the service on the one of the clusters using the allocated resources.

In other features, the machine readable instructions further configure the processor to, when the portion of the computing resources is at least partially available in the one or more cluster, initiate instantiation processing based on the allocated reserved resources on the one of the clusters independently of availability of the remainder of the resources.

In still other features, a system comprises a processor and machine readable instructions stored on a tangible machine readable medium. When executed by the processor, the machine readable instructions configure the processor to receive a request for a plurality of resources of a cloud computing system to deploy a service on the cloud computing system. The machine readable instructions configure the processor to determine whether a portion of the plurality of resources is at least partially available in one or more clusters of nodes in the cloud computing system. The machine readable instructions configure the processor to reserve for a predetermined period of time, when the portion of the plurality of resources is at least partially available in one or more clusters, the at least partially available portion of resources in the one or more clusters to deploy the service on the cloud computing system. The machine readable instructions configure the processor to release after the predetermined period of time, when the portion of the plurality of resources is at least partially unavailable in one of the clusters, the reserved resources in the one or more clusters.

In other features, the portion of the plurality of resources is scarce than remainder of the plurality of resources in the one or more clusters.

In other features, the machine readable instructions further configure the processor to, when the portion of the plurality of resources is at least partially available in the one or more clusters: locate at least a portion of remainder of the plurality of resources in the cloud computing system; allocate the reserved resources on one of the clusters and the located portion of the remainder of the plurality of resources to deploy the service on the cloud computing system; and instantiate the service on the one of the clusters using the allocated resources.

In other features, the machine readable instructions further configure the processor to locate at least a portion of remainder of the plurality of resources in the cloud computing system after the at least partially available portion of the plurality of resources is reserved in the one or more clusters.

In other features, the machine readable instructions further configure the processor to locate at least a portion of remainder of the plurality of resources in the cloud computing system while determining whether the portion of the plurality of resources is at least partially available in the one or more clusters.

In other features, the machine readable instructions further configure the processor to, when the portion of the plurality of resources is at least partially available in the one or more clusters: allocate the reserved resources on one of the clusters; and initiate instantiation processing based on the allocated reserved resources on the one of the clusters independently of availability of remainder of the plurality of resources.

In other features, the machine readable instructions further configure the processor to, when the portion of the plurality of resources is at least partially unavailable in one of the clusters, automatically release the reserved resources in response to expiration of the predetermined period of time.

In other features, the machine readable instructions further configure the processor to determine in parallel whether the portion of the plurality of resources is at least partially available in the one or more clusters.

In other features, the machine readable instructions further configure the processor to identify computing, networking, and storage resources from the plurality of resources, the portion of the plurality of resources including one or more of the computing resources, and remainder of the plurality of resources including the networking and storage resources.

In other features, the machine readable instructions further configure the processor to select the portion of the plurality of resources including a number of processor cores, an amount of memory, a number of instances of the service, and update and fault domain configurations.

In still other features, a method comprises receiving a request for a plurality of resources of a cloud computing system to deploy a service on the cloud computing system and determining whether a portion of the plurality of resources is at least partially available in one or more clusters of nodes in the cloud computing system, the portion of the plurality of resources being scarce than remainder of the plurality of resources in the one or more clusters. The method further comprises reserving for a predetermined period of time, when the portion of the plurality of resources is at least partially available in one or more clusters, the at least partially available portion of resources in the one or more clusters to deploy the service on the cloud computing system. The method further comprises releasing after the predetermined period of time, when the portion of the plurality of resources is at least partially unavailable in one of the clusters, the reserved resources in the one or more clusters. The method further comprises locating at least a portion of the remainder of the plurality of resources in the cloud computing system. The method further comprises allocating, when the portion of the plurality of resources is at least partially available in the one or more clusters, the reserved resources on one of the clusters and the located portion of the remainder of the plurality of resources to deploy the service on the cloud computing system.

In other features, the method further comprises instantiating the service on the one of the clusters using the allocated reserved resources and the allocated remainder of resources.

In other features, the method further comprises locating at least a portion of the remainder of the plurality of resources in the cloud computing system after the at least partially available portion of the plurality of resources is reserved in the one or more clusters.

In other features, the method further comprises locating at least a portion of the remainder of the plurality of resources in the cloud computing system while determining whether the portion of the plurality of resources is at least partially available in the one or more clusters.

In other features, the method further comprises, when the portion of the plurality of resources is at least partially available in the one or more clusters: allocating the reserved resources on one of the clusters; and initiating instantiation processing based on the allocated reserved resources on the one of the clusters before locating the remainder of the plurality of resources.

In other features, the method further comprises determining in parallel whether the portion of the plurality of resources is at least partially available in the one or more clusters.

In other features, the method further comprises identifying computing, networking, and storage resources from the plurality of resources, the portion of the plurality of resources including one or more of the computing resources, and the remainder of the plurality of resources including the networking and storage resources.

In other features, the method further comprises selecting the portion of the plurality of resources including a number of processor cores, an amount of memory, a number of instances of the service, and update and fault domain configurations.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

In a cloud computing system, computing resources (e.g., processor cores, physical memory, update and fault domains, number of service instances, and so on) are generally scarce (i.e., in short supply or less abundant) than networking and storage resources. Therefore, a service deployment process according to the present disclosure allows a service deployment workflow to first reserve a capacity for the more scarce computing resources, with some expiration provision, by providing a minimum required service model. If the capacity reservation for the computing resources succeeds, the service deployment workflow can proceed and commit/allocate other (networking and storage) resources and activate the service deployment.

For example, suppose that a workflow chooses to deploy a service across different resource pools, say P1, P2, and P3. Normally, if the computing/networking/storage resource allocations succeed in P1 and P2 but computing resource allocation fails in P3, the workflow needs to rollback all the resource allocations in P1 and P2. If, however, information that computing resources are scarce is already available, sequencing these resource allocations can allow the system to fail fast by failing on the more scarce resource first and not having to allocated the other resources.

The deployment process according to the present disclosure uses resource availability information to decide the sequence for resource allocations. A reserve-activate (i.e., first reserve, then activate) method according to the present disclosure, which is explained below in detail, provides a way to exercise resource availability and uses that information to reduce deployment failures. The reserve-activate method provides a protocol where more scarce resources can be allocated and reserved first with an expiry, followed by rest of the resource allocations and activation.

For example, suppose that workflow based on resource utilization data chooses to deploy a service across different resource pools, say P1, P2, and P3. The reserve-activate method can define the following protocol: Reserve more scarce resources first across all resource pools P1, P2, and P3 with an expiry. If all reservations pass, then (or in parallel) initiate allocations for other resources (networking and storage) everywhere (P1, P2, and P3). Suppose further that these other resource allocations are expected to succeed. When all of the resource allocations succeed, proceed with activation. If the reservation of the more scarce resources fails in the first step, simply rollback reserved resources, and choose a different set of resource pools (say A1, A2 and A3), and start from the first step, or promptly report a deployment failure to the customer.

Accordingly, the reserve-activate method of the present disclosure includes at least the following features and provides at least the following technical effects. The method separates resource allocation from activation and dissociates the scarce computing resource requirements from the rest of the resource requirements. The method reserves the more scarce computing resources first, which helps reduce workflow failures and extensive rollbacks. The method can provide a partial tenant model for reservation of the scarce computing resources and initiate all possible workflows with available information, which can increase parallelization. The method can perform partial reservations across resource pools. The method can update and augment allocated resources before actual activation. The method can easily reverse a reservation using the expiration provision. These and other features of the reserve-activate method are described below in detail.

The present disclosure is organized as follows. Before describing the reserve-activate method in detail, a simplified example of a cloud computing system is described below with reference to FIG. 1, followed by a more detailed description of a typical service deployment workflow that does not use the reserve-activate method. Subsequently, the reserve-activate method is described in detail with reference to FIG. 2. Thereafter, with reference to FIGS. 3-5, a simplified example of a distributed network system is described, which can be used to implement the cloud computing system shown in FIG. 1.

Figure 1:
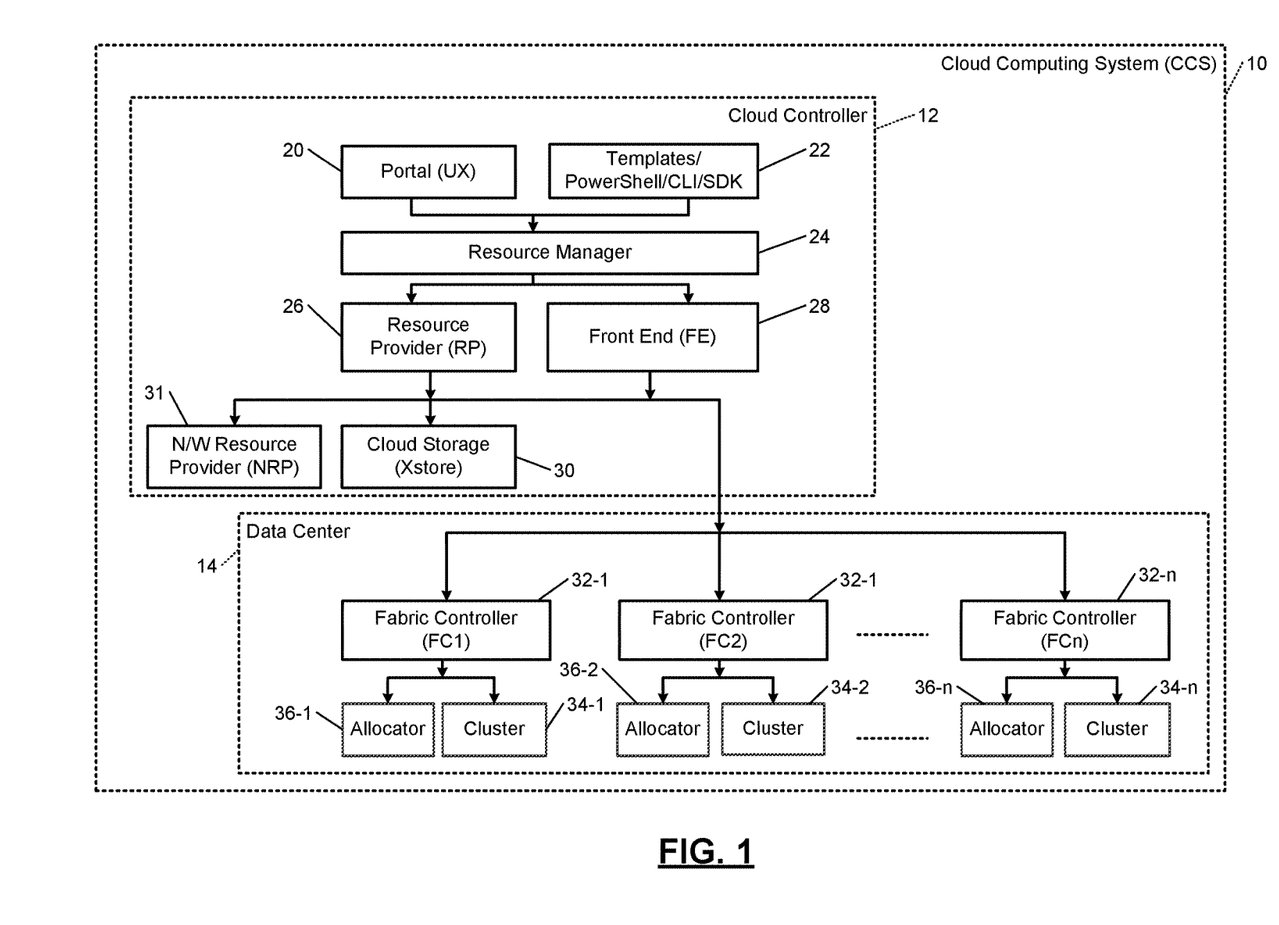
FIG. 1 is a functional block diagram of a simplified example of a cloud computing system that deploys a cloud service with capacity reservation followed by activation.

FIG. 1 shows a simplistic example of a cloud computing system (CCS) 10 according to the present disclosure. The cloud computing system 10 includes a cloud controller 12 and at least one data center 14. While only one data center 14 is shown for simplicity, the cloud controller 12 can interface with a plurality of data centers. Further, while the data center 14 is shown as being local to the cloud controller 12, one or more data centers may be geographically remote from the cloud controller 12 and may communicate with the cloud controller 12 via various networks.

Each data center includes a plurality of fabric controllers 32-1, 32-2, . . . , 32-n (collectively fabric controller 32) and corresponding clusters 34-1. 34-2, . . . , 34-n (collectively clusters 34). Each fabric controller 32 controls a respective cluster 34. Each cluster 34 includes a plurality of racks (now shown), and each rack includes a plurality of nodes (also not shown), which are also called servers, hosts, or machines. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32.

A typical service deployment workflow that does not use the reserve-activate method of the present disclosure executes as follows. The cloud resource manager 24 receives a request from the portal 20 to deploy a service. The request includes the minimum information required to deploy the service. For example, the minimum information includes rules, update and fault domain configurations, a number of processor cores, an amount of physical memory, a number of instances of the service, and so on. These are called computing resources. In addition, the minimum information includes requests for networking resources such as virtual networks (VNETs), virtual IPs (VIPs), and so on. Further, the minimum information includes requests for storage resources such as number of disks or disk space.

Generally, the resources that the customer requires to run the service successfully in the cloud environment can be divided into various levels. One level of resources is called regional level resources, which can be effectively used anywhere in a region, where a region is a collection of data centers (e.g., North America is a region). Another level of resources is resources within a data center, which are called local resources. To illustrate, a virtual IP is a regional resource that can be used in any cluster. However, an actual physical node and a device IP (DIP) assigned to the node are local resources that are managed at a cluster level since a node cannot be selected at a regional level.

Accordingly, in the workflow, presently the customer first acquires all the regional resources before selecting a cluster for deploying a service since the regional resources can be used anywhere within the cloud computing system. For example, the compute resource provider 26 calls the Xstore 30 and the network resource provider 31 that respectively manage the regional network and storage resources (e.g., VNETs, VIPs, disks and so on). The Xstore 30 and the network resource provider 31 respectively allocate to the tenant the regional network and storage resources (e.g., VNETs, VIPs, disks and so on) based on the minimum information received from the customer.

The compute resource provider 26 generates a final tenant model based on the minimum information and provides the final tenant model to one of the fabric controllers 32. The final tenant model has all the resource information including compute/network/storage resource information. The fabric controller 32 calls the local allocator 36. The allocator 36 commits a compute capacity for the tenant according to the final tenant model if the compute capacity is available in the cluster 34. In addition, the allocator 36 commits cluster level network resources (e.g., DIPs and so on) to the tenant according to the final tenant model. If all of the resource allocations succeed, the final tenant model is compiled and executed to instantiate the tenant, which involves creating a virtual machine, programming network interfaces, and so on. In addition, the regional resources selected earlier are associated with the tenant instance. At this point, the deployment of the tenant service is complete.

If, however, after the final tenant model is received at the fabric controller 32, the allocator 36 cannot allocate or fails to allocate the required compute capacity to the tenant, the deployment fails, and all of the other resources that were allocated so far have to be rolled back. The compute resource provider 26 has to communicate with the Xstore 30 and the network resource provider 31 and roll back the storage and networking resources that were previously allocated to the tenant. These rollbacks can be extensive and can add delays to the deployment process as well as delay a failure notification to the customer.

With tenants spanning across multiple resource pools, if one fabric controller 32 fails to allocate the required compute capacity to the tenant, the compute resource provider 26 can sequentially investigate whether a next fabric controller 32 can provision the required compute capacity to the tenant. However, after each fabric controller 32 fails to allocate the required compute capacity to the tenant, the compute resource provider 26 has to communicate with the Xstore 30 and the network resource provider 31 and roll back the storage and networking resources that were previously allocated to the tenant. Thereafter, before checking if a next fabric controller 32 can provision the required compute capacity to the tenant, the compute resource provider 26 once again calls the Xstore 30 and the network resource provider 31, which once again respectively allocate to the tenant the regional network and storage resources (e.g., VNETs, VIPs, disks and so on) based on the minimum information received from the customer. Only then the compute resource provider 26 can investigate whether a next fabric controller 32 can provision the required compute capacity to the tenant. Again, these additional rollback and re-initiation processes can be extensive and can add significant delays to the deployment process and further delay the failure notification to the customer.

The reserve-activate method of the present disclosure avoids these rollbacks and improves tenant deployment performance as follows. The compute resource provider 26 can generate a tenant model including only the computing resource requirements based on the information received from the customer in the request to deploy the service. The compute resource provider 26 first forwards the tenant model including only the computing resource requirements to one or more fabric controllers 32 in parallel irrespective of the availability of the other (e.g., networking and storage) resources. Based on the tenant model including the computing resource requirements, the one or more fabric controllers 32 communicates with the local allocator 34 and attempts to reserve the requested computing resources with an expiration provision on the cluster 36 associated with the respective fabric controller 32. If the requested computing resources are available on one or more of the clusters 36, the attempt to reserve the requested computing resources on the one or more clusters 36 will pass. The compute resource provider 26 allocates to the tenant service the requested computing resources on the one or more clusters 36 on which the attempt to reserve the same passed.

The compute resource provider 26 then provides a final tenant model including the other resource requirements to the one or more fabric controllers 32 where the computing resources are already reserved and allocated on the respective clusters 36. When all of the resource allocations succeed, the allocated resources are activated by compiling and executing the final tenant model on one of the clusters 36 where all of the resource allocations succeeded, and the tenant service is instantiated on that cluster 36.

If, however, the requested computing resources are not available on one or more of the clusters 36, the attempt to reserve the requested computing resources on the one or more clusters 36 will fail. In case of a failure, the customer can be quickly informed of the failure. Further, only the reserved computing resources need to be rolled back instead of rolling back the entirety of resources.

Further, some of the reserved computing resources are independent of the other resources. Therefore, further processing of these independent reserved computing resources (e.g., allocating (though not starting) a virtual machine (VM), downloading an operating system (OS) for the VM, or whatever processing is possible without the other resources) can begin immediately without waiting for allocation of the other resources, which can speed up the service deployment. Since the compute resource provider 26 incrementally delivers the tenant model to the fabric controllers 32, the processing of the reserved computing resources that are independent of the other resources can start immediately upon reservation succeeding for the received incremental portions of the tenant model. The processing of the remaining reserved computing resources that are dependent on the other resources can start upon receiving the remaining portions of the tenant model (e.g., networking and storage resource requirements). Thus, by dissociating the computing resource requirements from the rest of the resource requirements and by first reserving the computing resource requirements, further processing of the computing resource requirements can begin without waiting for the allocation of the rest of the resources, which provides a head start for the deployment process.

Additionally, in some implementations, the compute resource provider 26 need not first reserve the computing resources and only then begin locating and allocating the other resources. Instead, the compute resource provider 26 can initiate the locating and allocating of the other resources while (i.e., in parallel with) attempting to reserve the computing resources to further speed up the deployment process.

Further, the reserved computing resources are reserved only for a predetermined period of time (referred to as the expiry or expiration provision). Accordingly, if the customer deletes the tenant or if the deployment fails because the other resources are unavailable, the compute resource provider 26 is not burdened with informing the fabric controllers 32 of the deployment failure and ensuring that the reserved computing resources are released. The compute resource provider 26 is also relieved from the burden of retrying communication with the fabric controllers 32 in case of link failures. The reservations automatically expire after the predetermined period of time. Alternatively, in some implementations, to expedite the release process, the compute resource provider 26 can optionally elect to explicitly request the fabric controllers 32 to release the reserved computing resources if the deployment fails.

Additionally, if the compute resource provider 26 eventually selects one of the clusters 36 for the deployment, the reservations on the other clusters 36 automatically expire after the predetermined period of time, or the compute resource provider 26 can optionally elect to explicitly request the other fabric controllers 32 to release the reserved computing resources on the respective clusters 36. Accordingly, the compute resource provider 26 is not burdened with this task.

Further, the reservation method allows for opportunistic allocation of resources. For example, the customer may specify a desire for a particular amount of computing resources but may also indicate willingness to accept a certain minimum amount of computing resources. In such a scenario, the method can try to reserve the particular amount across the fabric controllers 32. However, if less than the particular amount but at least the certain minimum amount of computing resources is available across the fabric controllers 32, the compute resource provider 26 can reserve the available amount and subsequently try to locate only the right amount of other resources (e.g., disk space) that are adequate for the reserved amount of computing resources. This sort of technical effect is achievable since the method first reserves the computing resources and then attempts to locate and allocate the other resources.

Figure 2:
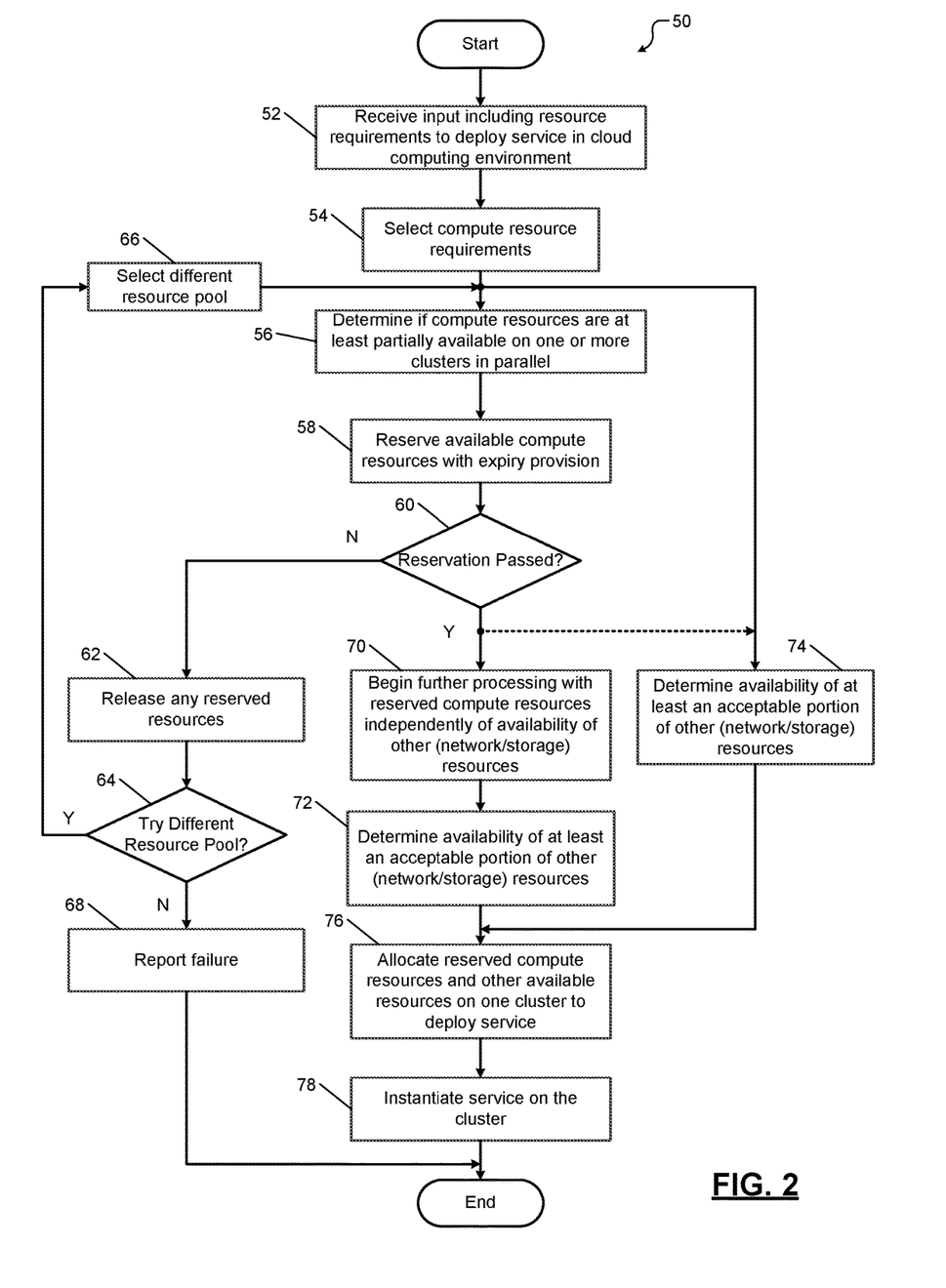
FIG. 2 is a flowchart illustrating an example of a method for deploying a cloud service with capacity reservation followed by activation.

FIG. 2 shows an example of the reserve-activate method 50 for deploying a tenant service in the cloud computing environment according to the present disclosure. The term control as used below refers to one or more of the client and server applications 166 and 186 described below with reference to FIGS. 3-5, which implement all or some aspects of the reserve-activate method. In other words, the term control as used below represents code or instructions executed by one or more components of the cloud computing system 10 shown in FIG. 1 to perform the described functionality.

At 52, control receives input from the customer including resource requirements to deploy a service in the cloud computing environment. For example, the inputs may include computing resource requirements such as rules, UD/FD, cores, memory, and instances, and so on; network resource requirements including VNETs, VIPs, and so on; and storage resource requirements such as disks.

At 54, control selects computing resource requirements from the input. At 56, control determines if the requested computing resources are at least partially available on or across one or more clusters in parallel. For example, two clusters together may be able to provision the entire or at least a partial (minimum required) amount of the computing resources that may be acceptable to the customer if the entire amount is unavailable.

At 58, if the computing resources are available on one more clusters, control reserves the available computing resources in these clusters with an expiration provision. At 60, control determines if the reservation process passed (i.e., succeeded) in all of the clusters.

At 62, if the reservation process fails (i.e., if the computing resources are not available on one or more clusters), control releases the reserved computing resources either automatically on expiration of a predetermined period or optionally explicitly (by instructing the fabric controllers 32 to release the reserved resources). At 64, control determines whether to try another set of resource pools before reporting a failure to the customer. At 66, if control decides to try another set of resource pools before reporting a failure to the customer, control selects a different set of resource pools and returns to 56. At 68, if control decides to not try another set of resource pools before reporting a failure to the customer, control reports a failure to the customer.

At 70, if the reservation process passed (i.e., if the computing resources are available on all of the clusters) at 60, control begins further processing using those resources from the reserved computing resources that are independent of the other (networking/storage) resources. At 72, control determines the availability of at least acceptable portions of the other (networking/storage) resources. In some implementations, after 54 or 60, at 74, control can begin in parallel with the reservation process to determine the availability of at least acceptable portions of the other (networking/storage) resources.

At 76, on determining the availability of at least acceptable portions of the other (networking/storage) resources, control allocates the reserved computing resources on a selected cluster and allocates the other available resources to deploy the service on the selected cluster. At 72, control creates a final tenant model based on all of the allocated resources, compiles and executes the final tenant model, and instantiates the service on the selected cluster.

Accordingly, the reserve-activate method provides fast deployment due to several processes performed in parallel. For example, the method queries multiple fabric controllers for the computing resources in parallel. Further, the method can also try to locate the other resources while (i.e., in parallel with) the computing resources are being reserved. Furthermore, the method can begin further processing using the reserved computing resources that are independent of the other resources, without waiting for the location and allocation of the other resources. These parallel processes significantly increase the deployment speed and also allows faster failure reporting to the customer if the reservation fails. Additionally, the method allows for partial and opportunistic allocation of resources as explained above, which further improves the performance of the deployment process.

Below are simplistic examples of a distributed computing environment in which the systems and methods of the present disclosure can be implemented. Throughout the description, references to terms such as servers, client devices, applications, and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 3:
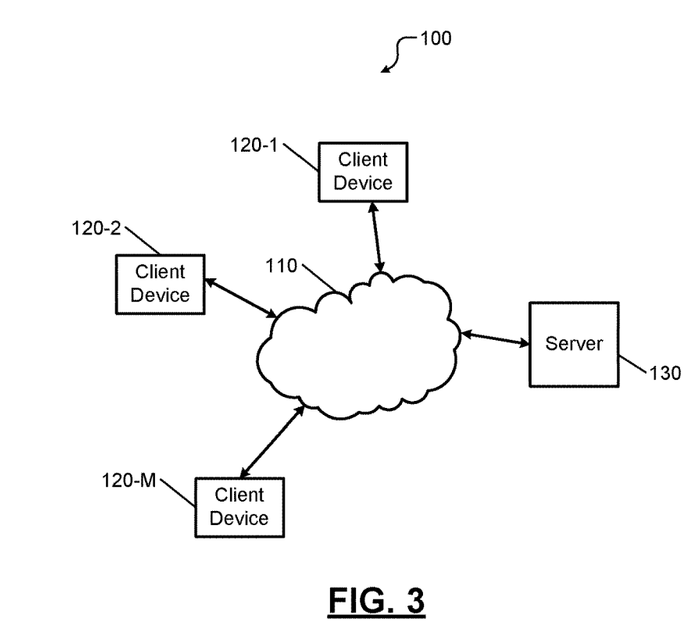
FIG. 3 is a functional block diagram of a simplified example of a distributed network system.

FIG. 3 shows a simplified example of a distributed network system 100. The distributed network system 100 includes a network 110, one or more client devices 120-1, 120-2, . . . , and 120-N (collectively client devices 120) (where N is an integer greater than or equal to one), and a server 130. The network 110 may include a local area network (LAN), a wide area network (WAN) such as the Internet, or other type of network (collectively shown as the network 110). While only one server is shown, the distributed network system 100 may include multiple servers. The client devices 120 communicate with the server 130 via the network 110. The client devices 120 and the server 130 may connect to the network 110 using wireless and/or wired connections to the network 110.

One or more servers 130 and the client devices 120 may implement one or more components of the cloud computing system 10 shown in FIG. 1. For example, one server 130 may implement the compute resource provider 26 of the cloud controller 12 while one or more client devices 120 may implement the fabric controllers 32.

The server 130 may provide multiple services to the client devices 120. For example, the server 130 may execute a plurality of software applications. The server 130 may host multiple databases that are utilized by the plurality of software applications and that are used by the client devices 120. In addition, the server 130 and the client devices 120 execute applications that implement the reserve-activate method of the present disclosure.

Figure 4:
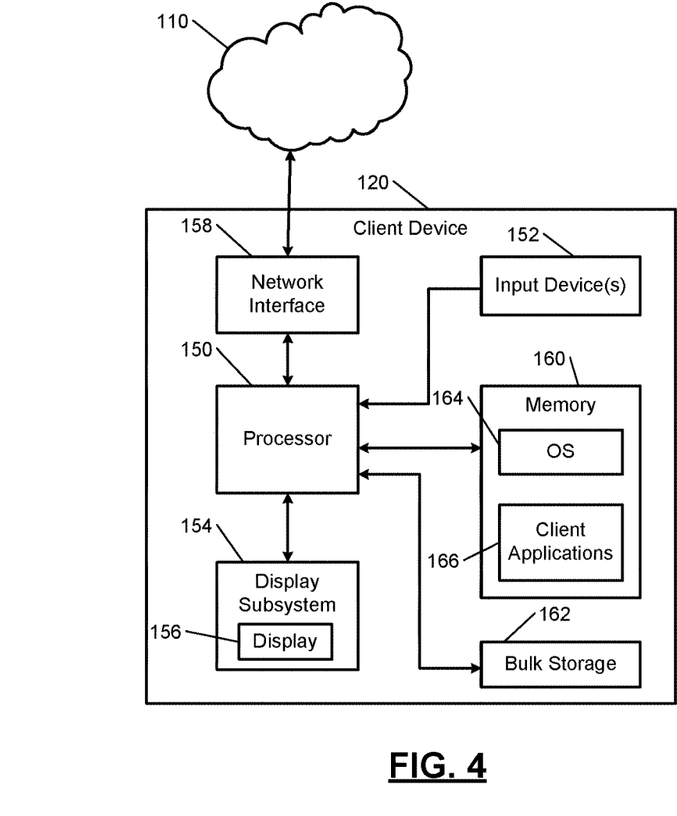
FIG. 4 is a functional block diagram of a simplified example of a client device used in the distributed network system of FIG. 3.

FIG. 4 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more applications executed by the server 130 via the network 110. The client applications 166 also include an application that implements all or some aspects of the reserve-activate method of the present disclosure.

Figure 5:
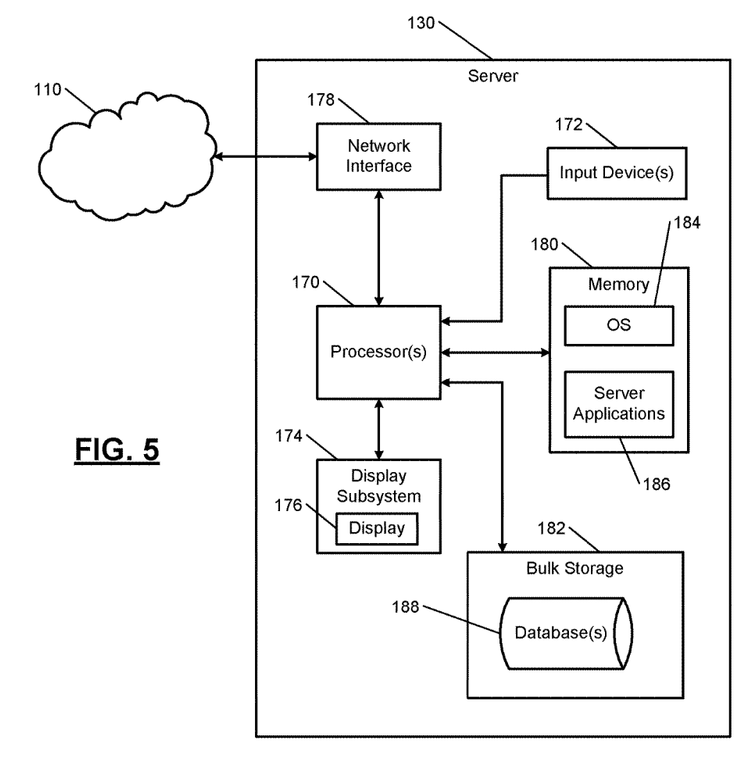
FIG. 5 is a functional block diagram of a simplified example of a server used in the distributed network system of FIG. 3.

FIG. 5 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186. The server applications 186 include an application that implements all or some aspects of the reserve-activate method of the present disclosure. The bulk storage 182 may store one or more databases 188 that store data structures used by the server applications 186 to perform respective functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for deploying a service in a cloud computing system, the system comprising:
   a processor; and
   machine readable instructions, stored on a tangible machine readable medium, when executed by the processor, configure the processor to:
   receive a request for deployment of the service on the cloud computing system;
   identify a plurality of resource pools on the cloud computing system for deploying the service;
   selectively identify a portion of the plurality of resource pools based on availability of the portion relative to availability of one or more additional portions of the plurality of resource pools;
   initiate reserving, for a predetermined period of time, the identified portion of the plurality of resource pools for allocation prior to activating deployment of the service on the cloud computing system;
   if reserving the identified portion of the plurality of resource pools is unsuccessful, release, within or after the predetermined period of time, the identified portion of the plurality of resource pools and identify another plurality of resource pools on the cloud computing system for deploying the service; and
   if reserving the identified portion of the plurality of resource pools is successful, reserve the one or more additional portions of the plurality of resource pools for allocation.

2. The system of claim 1 wherein the machine readable instructions further configure the processor to, if reserving the identified portion of the plurality of resource pools is successful, initiate instantiation processing based on the reserved portion of the plurality of resource pools independent of availability of the one or more additional portions of the plurality of resource pools.

3. A system comprising:
   a processor; and
   machine readable instructions, stored on a tangible machine readable medium, when executed by the processor, configure the processor to:
   receive a request for deployment of a service on a cloud computing system;
   identify a plurality of resource pools on the cloud computing system for deploying the service;
   selectively identify a portion of the plurality of resource pools based on availability of the portion relative to availability of one or more additional portions of the plurality of resource pools;
   reserve, for a predetermined period of time, the identified portion of the plurality of resource pools for allocation prior to activating deployment of the service on the cloud computing system; and
   in response to successfully reserving the identified portion of the plurality of resource pools, reserve the one or more additional portions of the plurality of resource pools for allocation.

4. The system of claim 3 wherein the portion of the plurality of resource pools is identified based on a determination that resources of the portion are more scarce than the one or more additional portions of the plurality of resource pools.

5. The system of claim 3 wherein the machine readable instructions further configure the processor to, in response to successfully reserving the identified portion of the plurality of resource pools:
   locate the one or more additional portions of the plurality of resource pools;
   allocate the identified portion of the plurality of resource pools for deployment of the service on the cloud computing system; and
   instantiate the service on the identified portion of the plurality of resources.

6. The system of claim 3 wherein the machine readable instructions further configure the processor to locate the one or more additional portions of the plurality of resource pools after the identified portion of the plurality of resource pools is reserved.

7. The system of claim 3 wherein the machine readable instructions further configure the processor to locate the one or more additional portions of the plurality of resource pools while selectively identifying the portion of the plurality of resource pools based on availability of the portion relative to availability of one or more additional portions of the plurality of resource pools.

8. The system of claim 3 wherein the machine readable instructions further configure the processor to, in response to successfully reserving the identified portion of the plurality of resource pools:
   allocate the reserved portion of the plurality of resource pools for deployment of the service; and initiate instantiation processing based on the allocated reserved portion of the plurality of resource pools independent of availability of the one or more additional portions of the plurality of resource pools.

9. The system of claim 3 wherein the machine readable instructions further configure the processor to identify computing, networking, and storage resources from the plurality of resource pools, the identified portion of the plurality of resource pools including one or more of the computing resources, and the one or more additional portions remainder of the plurality of resource pools including the networking and storage resources.

10. The system of claim 3 wherein the machine readable instructions further configure the processor to select the identified portion of the plurality of resource pools including a number of processor cores, an amount of memory, a number of instances of the service, and update and fault domain configurations.

11. A method comprising:
receiving a request for deployment of a service on a cloud computing system;
identifying a plurality of resource pools on the cloud computing system for deploying the service;
selectively identifying a portion of the plurality of resource pools based on availability of the portion relative to availability of one or more additional portions of the plurality of resource pools, the identified portion of the plurality of resource pools being more scarce than the one or more additional portions of the plurality of resource pools of the plurality of resource pools;
initiating reserving, for a predetermined period of time, the identified portion of the plurality of resource pools for allocation prior to activating deployment of the service on the cloud computing system;
if reserving the identified portion of the plurality of resource pools is unsuccessful, releasing, within or after the predetermined period of time, the identified portion of the plurality of resource pools and identifying another plurality of resource pools on the cloud computing system for deploying the service; and
if reserving the identified portion of the plurality of resource pools is successful, allocating the reserved identified portion of the plurality of resource pools for deploying of the service on the cloud computing system.

12. The method of claim 11 further comprising instantiating the service on a cluster of the cloud computing system using the allocated reserved identified portion of the plurality of resource pools and the one or more additional resource pools of the plurality of resource pools.

13. The method of claim 11 further comprising locating the one or more additional portions of the plurality of resource pools of the plurality of resource pools after the identified portion of the plurality of resource pools is reserved.

14. The method of claim 11 further comprising locating at least a portion of the one or more additional resource pools of the plurality of resource pools while selectively identifying the portion of the plurality of resource pools.

15. The method of claim 11 further comprising, if reserving the identified portion of the plurality of resource pools is successful:
allocating the reserved identified portion of the plurality of resource pools for deployment of the service; and
initiating instantiation processing based on the allocated reserved identified portion of the plurality of resource pools before locating the one or more additional resource pools of the plurality of resource pools.

16. The method of claim 11 further comprising identifying computing, networking, and storage resources from the plurality of resource pools, the identified portion of the plurality of resource pools including one or more of the computing resources, and the one or more additional resource pools of the plurality of resource pools including the networking and storage resources.

17. The method of claim 11 further comprising selecting the identified portion of the plurality of resource pools including a number of processor cores, an amount of memory, a number of instances of the service, and update and fault domain configurations.

* * * * *